(12) United States Patent
Alexander et al.

(10) Patent No.: US 8,239,481 B2
(45) Date of Patent: *Aug. 7, 2012

(54) SYSTEM AND METHOD FOR IMPLEMENTING OPEN-CONTROL REMOTE DEVICE CONTROL

(75) Inventors: Bruce Alexander, Poulsbo, WA (US); Liem Bahneman, Bothell, WA (US)

(73) Assignee: Vigilos, LLC, Tyler, TX (US)

( * ) Notice: Subject to any disclaimer, the term of this patent is extended or adjusted under 35 U.S.C. 154(b) by 1109 days.

This patent is subject to a terminal disclaimer.

(21) Appl. No.: 12/054,217

(22) Filed: Mar. 24, 2008

(65) Prior Publication Data

US 2008/0215987 A1 Sep. 4, 2008

Related U.S. Application Data

(63) Continuation of application No. 10/013,408, filed on Dec. 6, 2001.

(60) Provisional application No. 60/254,031, filed on Dec. 6, 2000.

(51) Int. Cl.
  *G06F 15/16* (2006.01)
(52) U.S. Cl. .............................. 709/217; 709/223; 726/4
(58) Field of Classification Search .................. 709/203, 709/224, 217, 223; 340/541, 506; 348/14.05; 345/1.1; 710/11; 726/4
  See application file for complete search history.

(56) References Cited

U.S. PATENT DOCUMENTS

| | | |
|---|---|---|
| 4,216,375 A | 8/1980 | Ulch |
| 4,218,690 A | 8/1980 | Ulch |
| 4,581,634 A | 4/1986 | Williams |
| 4,714,995 A | 12/1987 | Materna |
| 4,721,954 A | 1/1988 | Mauch |
| 4,816,658 A | 3/1989 | Khandwala |
| 4,837,568 A | 6/1989 | Snaper |
| 4,839,640 A | 6/1989 | Ozer |
| 4,962,473 A | 10/1990 | Crain |
| 4,998,279 A | 3/1991 | Weiss |
| 5,097,505 A | 3/1992 | Weiss |

(Continued)

FOREIGN PATENT DOCUMENTS

EP 0804031 A2 10/1997

(Continued)

OTHER PUBLICATIONS

"EyeCast.com Introduces SchoolCast Services for School Safety Officials and Law Enforcement Agencies," EyeCast.com Press Release, Sterling, Va., Apr. 28, 1999, <http://www.eyecast.com/news/releases/090798.asp> [retrieved May 18, 2000], 2 pages.

(Continued)

*Primary Examiner* — Jungwon Chang
(74) *Attorney, Agent, or Firm* — Andrews Kurth LLP

(57) ABSTRACT

A system and method for implementing open-protocol remote device control are provided. A user accesses a common user interface for controlling one or more networked devices. Utilizing the interface, the user selects one or more actions. The selection is encoded in a standard protocol and transmitted to a premises server. The premises server obtains the selection, accesses a device interface database and translates the selection into a device-specific protocol. The translated instruction is transmitted to the selected device for implementation. The user interface then obtains any device return data for display on the user interface.

50 Claims, 10 Drawing Sheets

U.S. PATENT DOCUMENTS

| | | | |
|---|---|---|---|
| 5,210,873 A | | 5/1993 | Gay |
| 5,367,624 A | | 11/1994 | Cooper |
| 5,475,375 A | | 12/1995 | Barrett |
| 5,475,378 A | | 12/1995 | Kaarsoo |
| 5,544,062 A | | 8/1996 | Johnston, Jr. |
| RE35,336 E | | 9/1996 | Ulch |
| 5,600,368 A | | 2/1997 | Matthews, III |
| 5,614,890 A | | 3/1997 | Fox |
| 5,629,981 A | | 5/1997 | Nerlikar |
| 5,654,696 A | | 8/1997 | Barrett |
| 5,675,738 A | | 10/1997 | Suzuki |
| 5,678,039 A | | 10/1997 | Hinks |
| 5,680,328 A | | 10/1997 | Skorupski |
| 5,682,142 A | | 10/1997 | Loosmore |
| 5,729,471 A | | 3/1998 | Jain |
| 5,742,286 A | | 4/1998 | Kung |
| 5,768,119 A | | 6/1998 | Havekost |
| 5,870,733 A | | 2/1999 | Bass |
| 5,903,455 A | | 5/1999 | Sharpe, Jr. |
| 5,923,264 A | | 7/1999 | Lavelle |
| 5,960,174 A | | 9/1999 | Dew |
| 6,011,547 A | | 1/2000 | Shiota |
| 6,064,723 A | | 5/2000 | Cohn |
| 6,076,111 A | | 6/2000 | Chiu |
| 6,085,227 A | | 7/2000 | Edlund |
| 6,133,941 A | * | 10/2000 | Ono .......................... 348/14.05 |
| 6,157,956 A | | 12/2000 | Jensen |
| 6,166,729 A | | 12/2000 | Acosta |
| 6,233,588 B1 | | 5/2001 | Marchoili |
| 6,253,228 B1 | * | 6/2001 | Ferris et al. ................... 709/203 |
| 6,271,752 B1 | * | 8/2001 | Vaios ............................ 340/541 |
| 6,298,474 B1 | | 10/2001 | Blowers |
| 6,317,781 B1 | * | 11/2001 | De Boor et al. ............... 709/217 |
| 6,356,949 B1 | | 3/2002 | Katsandres |
| 6,362,836 B1 | | 3/2002 | Shaw |
| 6,430,740 B1 | | 8/2002 | Hart |
| 6,529,936 B1 | | 3/2003 | Mayo |
| 6,564,380 B1 | | 5/2003 | Murphy |
| 6,686,838 B1 | * | 2/2004 | Rezvani et al. ............... 340/506 |
| 6,785,730 B1 | * | 8/2004 | Taylor .......................... 709/230 |
| 6,867,749 B1 | * | 3/2005 | Il et al. ............................ 345/1.1 |
| 7,356,579 B1 | * | 4/2008 | Motoyama et al. ........... 709/224 |
| 7,370,074 B2 | * | 5/2008 | Alexander et al. ........... 709/203 |
| 2001/0042142 A1 | * | 11/2001 | Fukunaga et al. .............. 710/11 |
| 2002/0019945 A1 | | 2/2002 | Houston |
| 2002/0029263 A1 | | 3/2002 | Toyoshima |
| 2003/0140112 A1 | * | 7/2003 | Ramachandran et al. .... 709/217 |

FOREIGN PATENT DOCUMENTS

| | | |
|---|---|---|
| WO | WO 97/07486 A1 | 2/1997 |
| WO | WO 01/28251 A1 | 4/2001 |

OTHER PUBLICATIONS

"EyeCast.com Adds 360-Degree Continuous Pan Rotation Cameras to It's[sic] EyeView Service," EyeCast.com Press Release, Sterling, Va., Mar. 15, 1999, <http://www.eyecast.com/news/releases/031599.asp> [retrieved Sep. 21, 1999], 2 pages.

"Take a Step Into the Future . . . ," A-Tech Video Solutions, Inc., 1999, <www.remotecams.com> [retrieved Sep. 17, 1999], 6 pages.

"EyeCast Secures Deals—Security Companies to Use Firm's Off-Site Video Surveillance Technology," *Washington Business Journal*, Aug. 13-19, 1999, <http://www.eyecast.com/news/washbiz.asp> [retrieved Sep. 21, 1999], 2 pages.

"EyeCast.com Announces EyeView Control," EyeCast.com Press Release, Sterling, Va., Oct. 12, 1998 <http://www.eyecast.com/news/releases/101298.asp> [retrieved Sep. 24, 1999], 2 pages.

"EyeCast Announces EyeCapture Services," EyeCast.com Press Release, Sterling, Va., Jul. 8, 1998 <http://www.eyecast.com/news/releases/070898.asp> [retrieved Sep. 27, 1999], 2 pages.

"Providing Live Interactive Video for Surveillance & Monitoring Over the Internet," EyeCast.com, Inc., at least before Dec. 26, 2001, 27 pages.

"Axis 200 + Web Camera," © 1998 Axis Communications AB, 2 pages.

"Axis 240 Camera Server," © 1998 Axis Communications AB, 2 pages.

"30 Frames/Second," © 1993-1999 Axis Communications, <www.axis.se/products/cam_240/> [retrieved Sep. 28, 1999], 2 pages.

"Network Cameras Applications and Solutions," © 1993-1999 Axis Communications, <ww.axis.se/products/camera_servers/cam_app_sol.htm> [retrieved Sep. 28, 1999], 8 pages.

"Network Camera Servers: Features and Benefits," © 1993-1999 Axis Communications, <www.axis.se/products/camera_servers/cam_fb.html> [retrieved Sep. 28, 1999], 3 pages.

* cited by examiner

SYSTEM AND METHOD FOR IMPLEMENTING OPEN-CONTROL REMOTE DEVICE CONTROL

CROSS-REFERENCES TO RELATED APPLICATIONS

This application is a continuation of application Ser. No. 10/013,408, filed Dec. 6, 2001, which claims the benefit of Provisional Application No. 60/254,031, filed Dec. 6, 2000, and both of which are incorporated herein by reference.

BACKGROUND

In general, the present invention relates to electronic hardware and computer software, and in particular, to a system and method for controlling networked devices through a common, remote user interface. Generally described, a communications network, such as a security-monitoring network, can often utilize a variety of devices within the network. For example, a security-monitoring network can include image capture monitoring devices, motion detection monitoring devices, loudspeaker output devices, and the like. Often, to manipulate a particular device, or obtain data from the device, the device requires some form of control/instruction from a proprietary user interface and/or proprietary protocol. For example, video camera manufacturers typically utilize proprietary protocols to govern control of both the mechanical features (pan, tilt, zoom, etc.) and electronic features (electronic shutter speed, etc.). Moreover, a single manufacturer may utilize different protocols for the different model devices or even different versions of the same model of device.

In one embodiment, in the event a network supports multiple networked devices, an authorized user within the network can utilize each individual manufacturer-provided user interface, such as a proprietary graphical user interface, to communicate with the respective hardware device. However, as the number of devices connected to the network increases, maintaining each user interface becomes problematic. For example, a user, such as a security monitor, must receive training and be proficient in each type of proprietary user interface. Additionally, the size and/or usability of a central control panel, such as a computer display screen, having each user interface display can become burdensome. Still further, the ability of a user to implement a common task, such as the activation of all the cameras, must be executed individually, one interface at a time.

In another embodiment, a network can attempt to implement a reduced number of device interfaces by incorporating a common user interface template, such as a common graphical user interface, in which each instance of a user interface is configured with the particular communication protocols of a selected hardware device. Although this conventional approach attempts to mitigate the number of interfaces a monitor would be required to learn, this approach can remain deficient for a number of reasons. In one aspect, the customized user interface for each device remains resident within the memory of the monitor's computer. Accordingly, non-authorized users may gain access to networked devices by accessing the resident user interface on the monitor's computer. In another aspect, because the custom user interfaces are resident on the client computer, the monitor is limited to either utilizing the same computer system for all device controls or to loading and maintaining the custom user interfaces on multiple computing devices. Additionally, the monitor may often be required to upgrade, or otherwise maintain, each instance of the user interface in the event the template is modified in any manner.

In a still further aspect, the addition or modification of one or more devices within the network can create a need to delete some or all of the custom user interfaces on each computer maintained by the monitor. Similarly, if a monitor were to only require access to a networked device one time, the monitor would still be required to load and store the custom configured user interface for that device on the user computer. In a still further aspect, a user, such as a monitor, may often have to manipulate multiple instances of the same user interface to control multiple networked devices at one time. Accordingly, the conventional common template approach remains deficient in requiring repeated actions, or the management of multiple interfaces at one time.

Based on the above-described deficiencies, there is a need for a system and method for implementing a common user interface for supporting different hardware device protocols in a network.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method for implementing open-protocol remote device controls are provided. A user accesses a common user interface for controlling one or more networked monitoring devices. Utilizing the interface, the user administrator selects one or more actions. The selection is encoded in a common general language and transmitted to a device server. The device server obtains the selection, accesses a device interface database and translates the selection into a device-specific protocol. The translated instruction is transmitted to the selected device for implementation. The user interface then obtains any device return data for display on the user interface.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
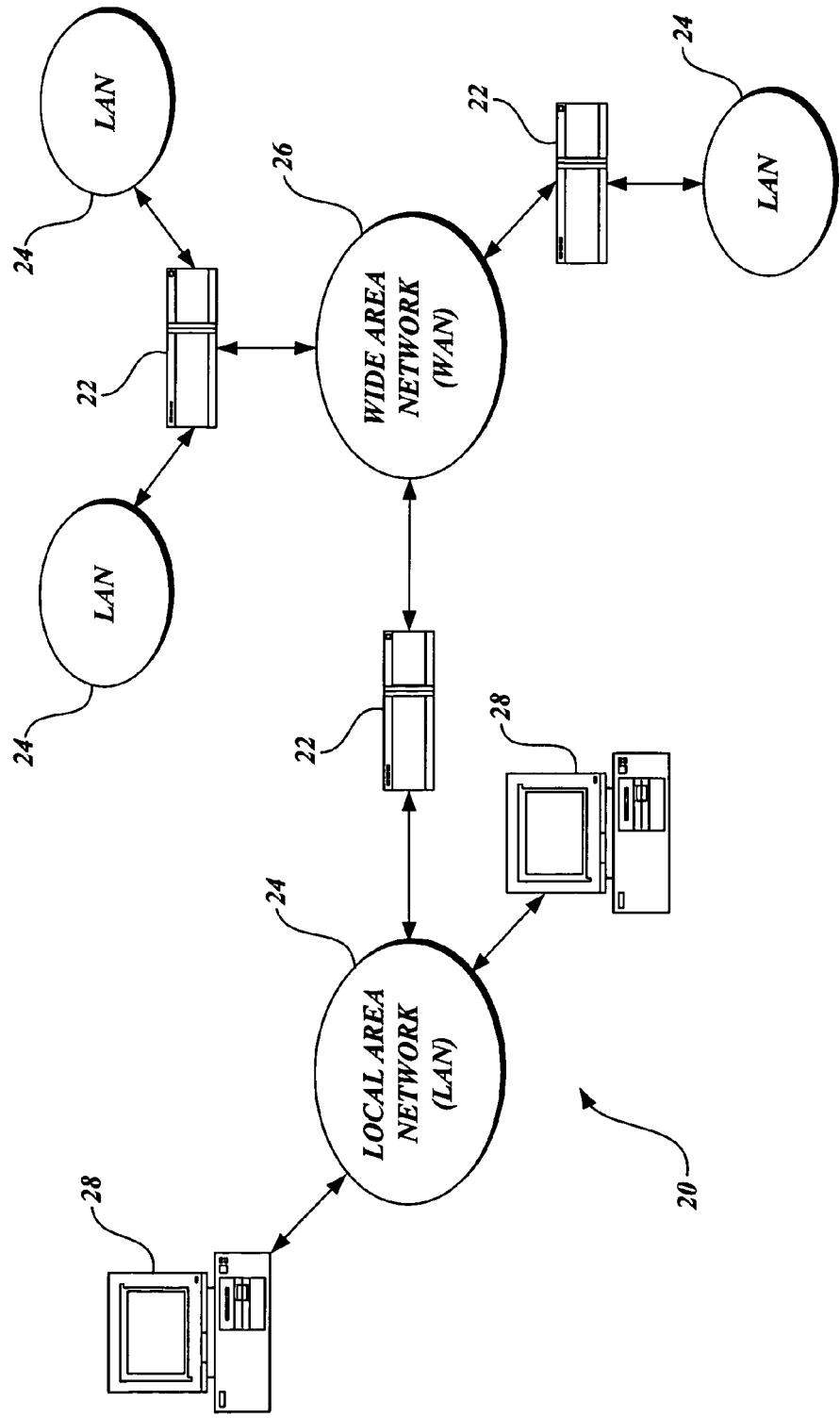
FIG. 1 is a block diagram illustrative of an Internet environment.

As described above, aspects of the present invention are embodied in a World Wide Web ("WWW" or "Web") site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, wherein a plurality of local area networks ("LANs") 24 and a wide area network ("WAN") 26 are interconnected by routers 22. The routers 22 are special purpose computers used to interface one LAN or WAN to another. Communication links within the LANs may be twisted wire pair, coaxial cable, or optical fiber, while communication links between networks may utilize 56 Kbps analog telephone lines, 1 Mbps digital T-1 lines, 45 Mbps T-3 lines, or other communications links known to those skilled in the art.

Furthermore, computers 28 and other related electronic devices can be remotely connected to either the LANs 24 or the WAN 26 via a modem and temporary telephone or wireless link. It will be appreciated that the Internet 20 comprises a vast number of such interconnected networks, computers, and routers and that only a small, representative section of the Internet 20 is shown in FIG. 1.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML") or other markup languages, which are electronically stored at "WWW sites" or "Web sites" throughout the Internet. Other interactive hypertext environments may include proprietary environments, such as those provided in America Online or other online service providers, as well as the "wireless Web" provided by various wireless networking providers, especially those in the cellular phone industry. It will be appreciated that the present invention could apply in any such interactive hypertext environments; however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents. Embedded within a hypertext document are a number of hyperlinks, i.e., highlighted portions of text that link the document to another hypertext document possibly stored at a Web site elsewhere on the Internet. Each hyperlink is assigned a Uniform Resource Locator ("URL") that provides the exact location of the linked document on a server connected to the Internet and describes the document. Thus, whenever a hypertext document is retrieved from any Web server, the document is considered retrieved from the World Wide Web. As is known to those skilled in the art, a Web server may also include facilities for storing and transmitting application programs, such as application programs written in the JAVA® programming language from Sun Microsystems, for execution on a remote computer. Likewise, a Web server may also include facilities for executing scripts and other application programs on the Web server itself.

A consumer or other remote access user may retrieve hypertext documents from the World Wide Web via a Web browser program. A Web browser, such as Netscape's NAVIGATOR® or Microsoft's Internet Explorer, is a software application program for providing a graphical user interface to the WWW. Upon request from the consumer via the Web browser, the Web browser locates and retrieves the desired hypertext document from the appropriate Web server using the URL for the document and the HTTP protocol. HTTP is a higher-level protocol than TCP/IP and is designed specifically for the requirements of the WWW. HTTP runs on top of TCP/IP to transfer hypertext documents between server and client computers. The WWW browser may also retrieve programs from the Web server, such as JAVA applets, for execution on the client computer.

Figure 2A:
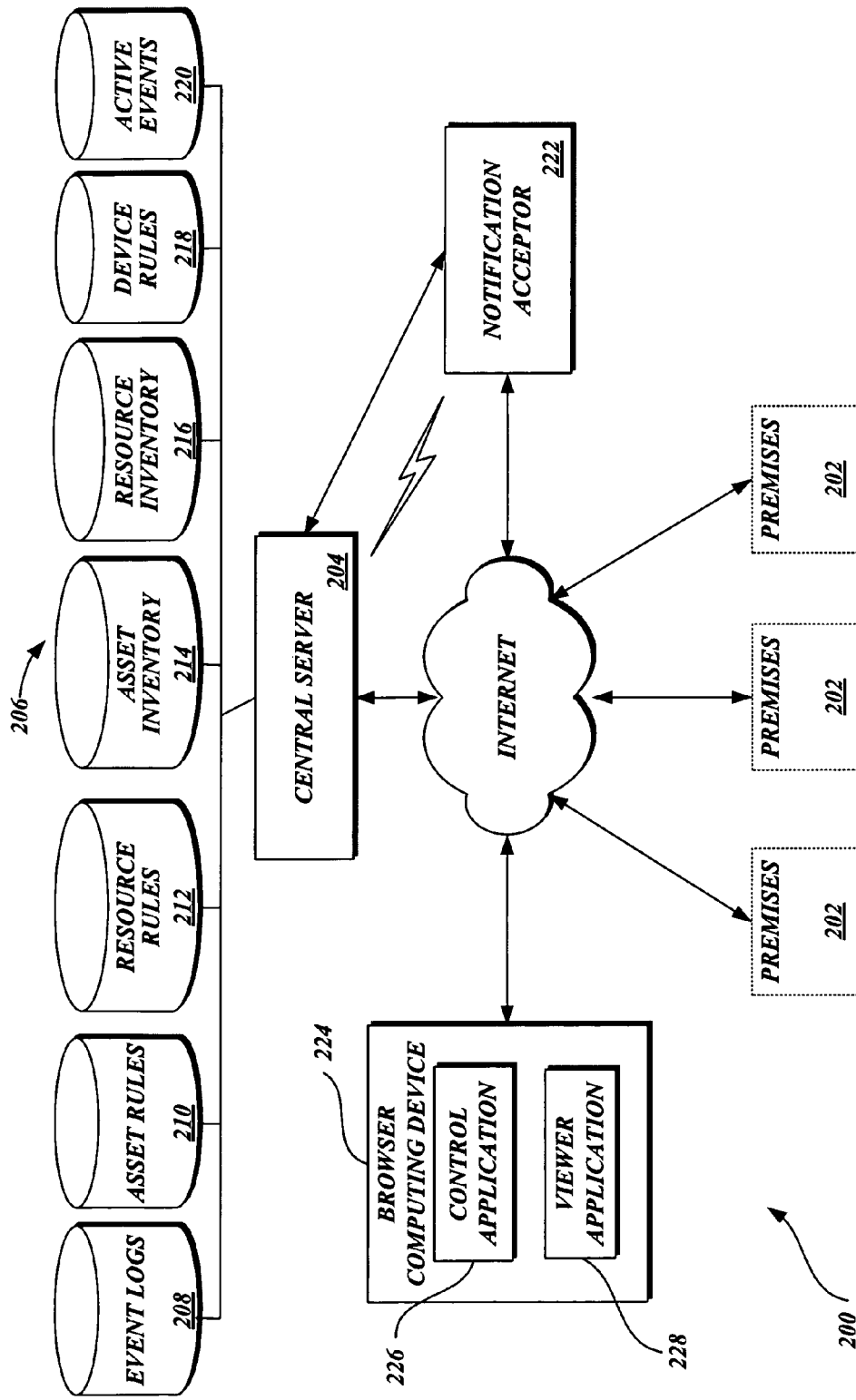
FIG. 2A is a block diagram of an integrated information system in accordance with the present invention.
Figure 2B:
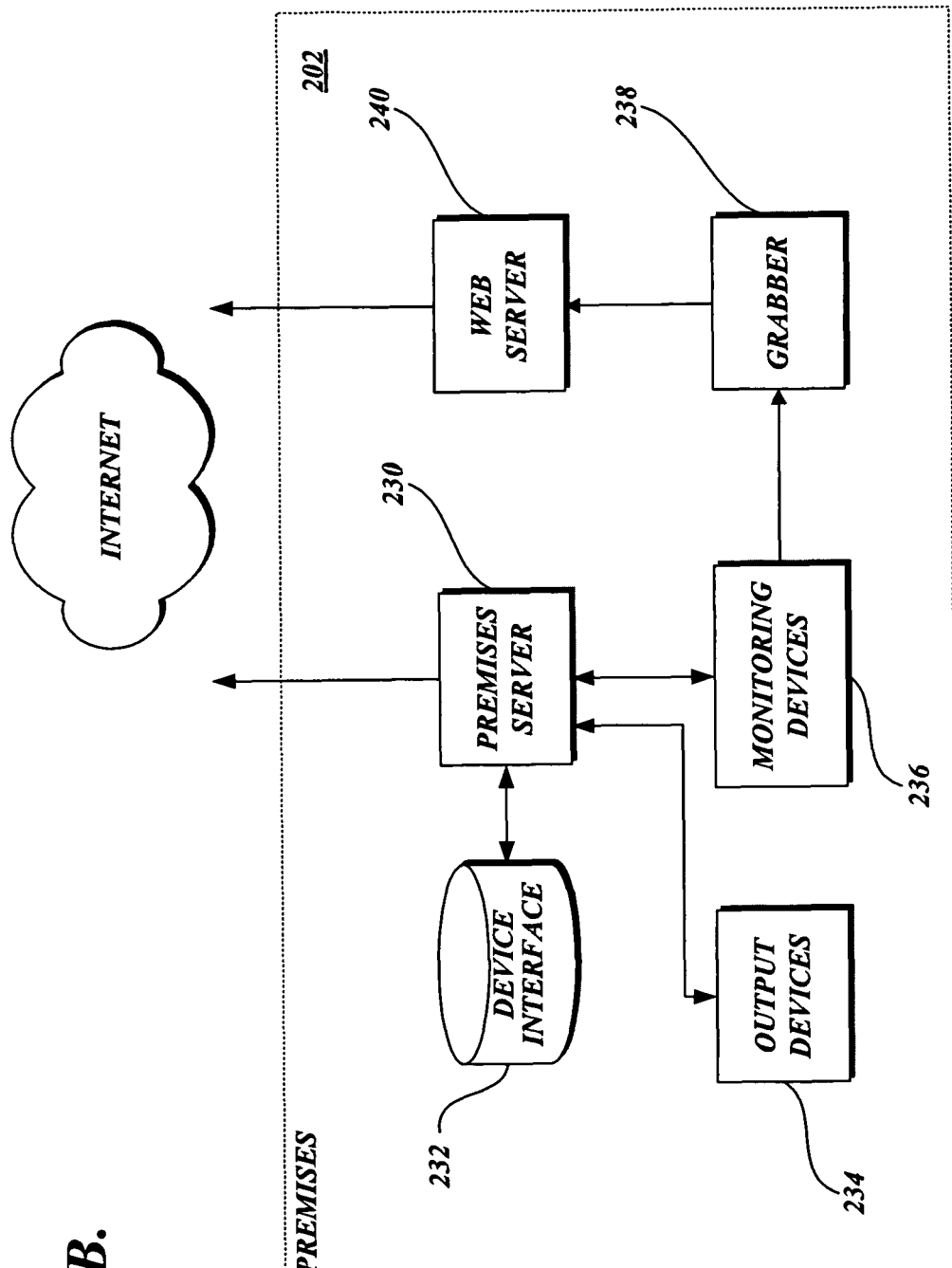
FIG. 2B is a block diagram of an integrated information system illustrating a premises server, monitoring devices, and output devices within a premises in accordance with the present invention.

Referring now to FIGS. 2A and 2B, an integrated information system 200 for use with the present invention will be described. Generally described, an integrated information system 200 is a subscriber-based system allowing a number of networked devices within one or more premises 202 to be monitored and/or controlled from a single user interface that may be remote from the one or more premises. In accordance with an illustrative embodiment of the present invention utilizing a monitoring network, data from one or more networked monitoring devices can be processed according to one or more rules that are stored and evaluated by a central processing server 204, or group of servers. In turn, the central processing server 204 can customize one or more output devices according to the preferences and rights of various system users. However, one skilled in the relevant art will appreciate that the disclosed integrated information system 200 is illustrative in nature and that the present invention may be utilized with alternative networks in communication with one or more devices.

With reference to FIG. 2A, in communication with the central server 204 is a central database 206 that includes a variety of databases including an event logs database 208, an asset rules database 210, a resource rules database 212, an asset inventory database 214, a resource inventory database 216, a device rules database 218, and an active events database 220. The utilization of some of the individual databases within the central database 206 will be explained in greater detail below. As will be readily understood by one skilled in the relevant art, the central database may be one or more databases that may be remote from one another. In an alternative embodiment, the central server 204 also maintains a device interface database for translating standard protocol-encoded tasks into device specific commands, as will be explained in greater detail below. Accordingly, the central server 204 may perform some or all of the translation actions in accordance with the present invention.

With continued reference to FIG. 2A, the central server 204 communicates with one or more notification acceptors 222. In an illustrative embodiment, the notification acceptors 222 can include one or more authorized users who are associated with the notification acceptor 222. Each authorized user has a preference of notification means and rights to the raw and processed monitoring data. The authorized users include premises owners, security directors or administrators, on-site security guards, technicians, remote monitors (including certified and non-certified monitors), customer service representatives, emergency personnel, and others. Moreover, the notification acceptor 222 may be a centralized facility/device that can be associated with any number of authorized users. As will be readily understood by one skilled in the art, various user authorizations may be practiced with the present invention. Additionally, it will be further understood that one or more of the rules databases may be maintained outside of the central server 204.

In an illustrative embodiment of the present invention, the central server 204 communicates with the notification acceptors 222 utilizing various communication devices and communication mediums. The devices include personal computers, hand-held computing devices, wireless application protocol enabled wireless devices, cellular or digital telephones, digital pagers, and the like. Moreover, the central server 204 may communicate with these devices via the Internet utilizing electronic messaging or Web access, via wireless transmissions utilizing the wireless application protocol, short message services, audio transmissions, and the like. As will be readily understood by one skilled in the art, the specific implementation of the communication mediums may require additional or alternative components to be practiced. All are considered to be within the scope of practicing the present invention.

In an illustrative embodiment of the present invention, a subscriber may request access to the integrated information system 200 by utilizing a browser computing device 224 connected to the system via a communication network, such as the Internet 20. Alternatively, the browser computing device 224 may be in direct communication with the central server 204, or other computing device on the network. In accordance with an actual embodiment of the present invention, the central server 204 authenticates a user corresponding to the browser computing device 224 and can transmit a control application 226 and/or a viewer application 228 to the browser computing device 224 such that the user is given access to one or more devices contained with the integrated information system 200. Accordingly, by manipulating the control application 226 and/or the viewer application 228, the user can manipulate any number of devices in the integrated information system 200. A more detailed description of the generation and manipulation of the control application 226 and viewer application 228 will be described below.

With reference now to FIG. 2B, each premises 202 can include one or more premises servers 230 operable to communicate with the components of the integrated information system 200. The premise server may include one or more device interface databases 232 for storing various device specific communication protocols and one or more standard integrated information system 200 communication protocols. As will be explained in greater detail below, utilizing the device interface database 232, the premises server 230 can translate standard communication protocol embedded control instructions transmitted from the central server 204 or browser computing device 224 into device-specific control instructions that will be sent to networked devices in communication with the premises server 230. The premises server 230 can also translate device-specific outputs, such as digital images, from networked devices into standard protocol embedded results that will be transmitted to the central server 204 and/or the browser computing device 224.

In accordance with an illustrative monitoring network embodiment, the premises server 230 can communicate with one or more monitoring devices 236. In an illustrative embodiment, the monitoring devices 236 can include smoke, fire and carbon monoxide detectors. The monitoring devices 236 can also include door and window access detectors, glass break detectors, motion detectors, audio detectors and/or infrared detectors. Still further, the monitoring devices 236 can include computer network monitors, voice identification devices, image capture devices, such as video cameras and still cameras, microphones and/or fingerprint, facial, retinal, or other biometric identification devices. Still further, the monitoring devices 236 can include conventional panic buttons, global positioning satellite ("GPS") locators, other geographic locators, medical indicators, and vehicle information systems. The monitoring devices 236 can also be integrated with other existing information systems, such as inventory control systems, accounting systems, or the like. It will be apparent to one skilled in the relevant art that additional or alternative monitoring devices 236 may be practiced with the present invention.

The premises server 230 also communicates with one or more monitoring devices 236. In an illustrative embodiment, the monitoring devices 234 can include audio speakers, display or other audio/visual displays. The monitoring devices 234 may also include electrical or electro-mechanical devices that allow the system to perform actions. The monitoring devices 234 can include computer system interfaces, telephone interfaces, wireless interfaces, door and window locking mechanisms, aerosol sprayers, and the like. One skilled in the relevant art will understand that the type of output device 236 is associated primarily with the type of action the system produces. Accordingly, additional or alternative monitoring devices 234 are considered to be within the scope of the present invention.

Generally described, the central server 204 obtains various monitoring device data, processes the data, and outputs the data to one or more authorized users. Additionally, some of the monitoring device 236 data may be directly transmitted to the browser computing device 224 for display to an authorized user. In an illustrative embodiment, the communication between the central server 204 and the premises server 230 is remote and two-way. One skilled in the relevant art will understand that the premises server 230 may be remote from the premises 202. In such an alternative embodiment, the monitoring devices 236 transmit the monitoring data to a remote premises server 230 or alternatively, they transmit the monitoring data directly to the central server 204. Alternatively, one skilled in the relevant art will also appreciate that the premises server 230 may also perform one or more of the functions illustrated for the central server 204.

For certain type of monitoring devices 236, such as image capture devices, additional devices or processes associated with imaging processing, usually called grabbers 238 are connected to or controlled by monitoring devices 236. Images from the image capture monitoring devices 236 are processed by the grabber 238 into certain generally acceptable standard image formats, such as bitmap, joint photographic expert group ("jpeg"), or the like. Additionally, the outputs from the grabber 238 may be transmitted to a web server 240 for delivery to the browser computing device 224.

Figure 3:
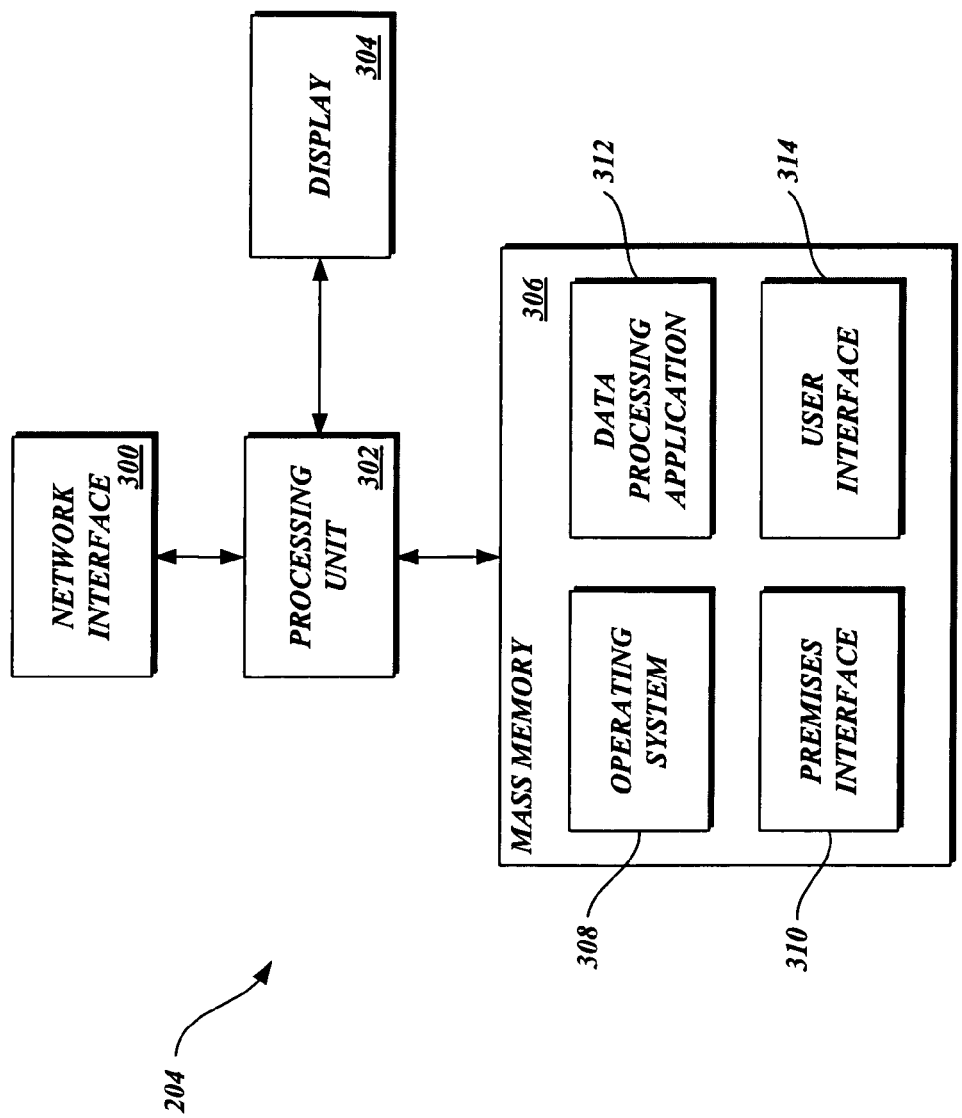
FIG. 3 is a block diagram depicting an illustrative architecture for a central server in accordance with the present invention.

FIG. 3 is a block diagram depicting an illustrative architecture for the central server 204. Those of ordinary skill in the art will appreciate that the central server 204 includes many more components then those shown in FIG. 3. However, it is not necessary that all of these generally conventional components be shown in order to disclose an illustrative embodiment for practicing the present invention. As shown in FIG. 3, the central server 204 includes a network interface 300 for connecting directly to a LAN or a WAN, or for connecting remotely to a LAN or WAN. Those of ordinary skill in the art will appreciate that the network interface 300 includes the necessary circuitry for such a connection, and is also constructed for use with the TCP/IP protocol or other protocols, such as Internet Inter-ORB Protocol ("IIOP"). The central server 204 may also be equipped with a modem for connecting to the Internet through a point-to-point ("PPP") connection or a serial-line Internet protocol ("SLIP") connection as known to those skilled in the art.

The central server 204 also includes a processing unit 302, a display 304, and a mass memory 306, all connected via a communication bus, or other communication device. The mass memory 306 generally comprises a RAM, ROM, and a permanent mass storage device, such as a hard disk drive, tape drive, optical drive, floppy disk drive, or combination thereof. The mass memory 306 stores an operating system for controlling the operation of the central server 204. It will be appreciated that this component may comprise a general-purpose server operating system as is known to those skilled in the art, such as UNIX, LINUX™, or Microsoft WINDOWS NT®. In an illustrative embodiment of the present invention, the central server 204 may also be controlled by a user through use of a computing device, which may be directly connected to or remote from the central server 204.

The mass memory 306 also stores program code and data for interfacing with the premises devices, for processing the device data, and for interfacing with various authorized users. More specifically, the mass memory 306 stores a premises interface application 310 in accordance with the present invention for obtaining data from a variety of monitoring devices 236 and for communicating with the premises server 230. The premises interface application 310 comprises computer-executable instructions that when executed by the central server 204, interface with the premises server 230, as will be explained below in greater detail. The mass memory 306 also stores a data processing application 312 for processing monitoring device data in accordance with rules maintained within the central server 204. The mass memory 306 further stores an authorized user interface application 314 for outputting the processed monitoring device data to a variety of authorized users in accordance with the security process of the present invention. It will be appreciated that these components may be stored on a computer-readable medium and loaded into the memory of the central server 204 using a drive mechanism associated with the computer-readable medium, such as a floppy disk, CD-ROM, DVD-ROM drive, or network interface 300.

Figure 4:
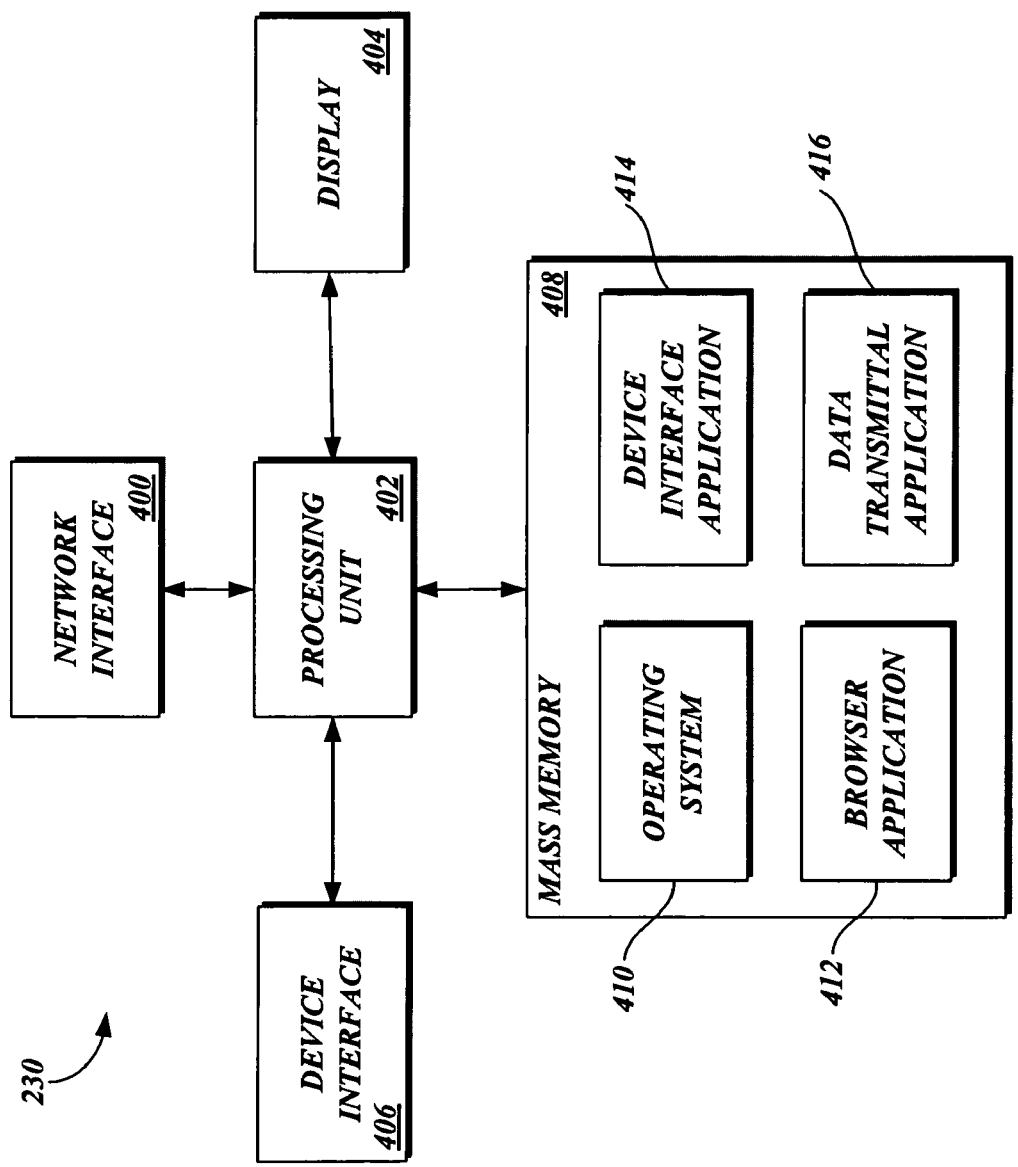
FIG. 4 is a block diagram depicting an illustrative architecture for a premises server in accordance with the present invention.

FIG. 4 is a block diagram depicting an illustrative architecture for a premises server 230 formed in accordance with the present invention. Those of ordinary skill in the art will appreciate that the premises server 230 includes many more components then those shown in FIG. 4. However, it is not necessary that all of these generally conventional components be shown in order to disclose an illustrative embodiment for practicing the present invention. As shown in FIG. 4, the premises server 230 includes a network interface 400 for connecting directly to a LAN or a WAN, or for connecting remotely to a LAN or WAN. Those of ordinary skill in the art will appreciate that the network interface 400 includes the necessary circuitry for such a connection, and is also constructed for use with the TCP/IP protocol or other protocols. The premises server 230 may also be equipped with a modem for connecting to the Internet through a PPP or SLIP connection as known to those skilled in the art.

The premises server 230 also includes a processing unit 402, a display 404, a device interface 406 and a mass memory 408, all connected via a communication bus, or other communication device. The device interface 406 includes hardware and software components that facilitate interaction with a variety of the monitoring devices 236 via a variety of communication protocols including TCP/IP, X10, digital I/O, RS-232, RS-485 and the like. Additionally, the device interface facilitates communication via a variety of communication mediums including telephone landlines, wireless networks (including cellular, digital and radio networks), cable networks, and the like. In an actual embodiment of the present invention, the I/O interface is implemented as a layer between the server hardware and software applications utilized to control the individual digital image devices. One skilled in the relevant art will understand that alternative interface configurations may be practiced with the present invention.

The mass memory 408 generally comprises a RAM, ROM, and a permanent mass storage device, such as a hard disk drive, tape drive, optical drive, floppy disk drive, or combination thereof. The mass memory 408 stores an operating system 410 for controlling the operation of the premises server 230. It will be appreciated that this component may comprise a general-purpose server operating system as is known to those skilled in the art, such as UNIX, LINUX™, or Microsoft WINDOWS NT®. The memory also includes a WWW browser 412, such as Netscape's NAVIGATOR® or Microsoft's Internet Explorer, for accessing the WWW.

The mass memory also stores program code and data for interfacing with various premises' monitoring devices 236, for processing the monitoring device data, and for transmitting the data to the central server 204 or browser computing device 224. More specifically, the mass memory stores an interface application 414 in accordance with the present invention for obtaining standard protocol-encoded commands from the browser computing device 224 or central server 204. Additionally, the interface application 414 obtains monitoring device data from the connected monitoring devices 236 and manipulates the data for processing by a central server 204, and for controlling the features of the individual monitoring devices 236. The interface application 414 comprises computer-executable instructions which, when executed by the premises server 230, obtains and transmits device data. The mass memory 408 also stores a data transmittal application program 416 for transmitting the device data to the central server 204 or browser computing device 224. It will be appreciated that these components may be stored on a computer-readable medium and loaded into the memory of the premises server 230 using a drive mechanism associated with the computer-readable medium, such as a floppy, CD-ROM, DVD-ROM drive, or network interface 400.

Figure 5:
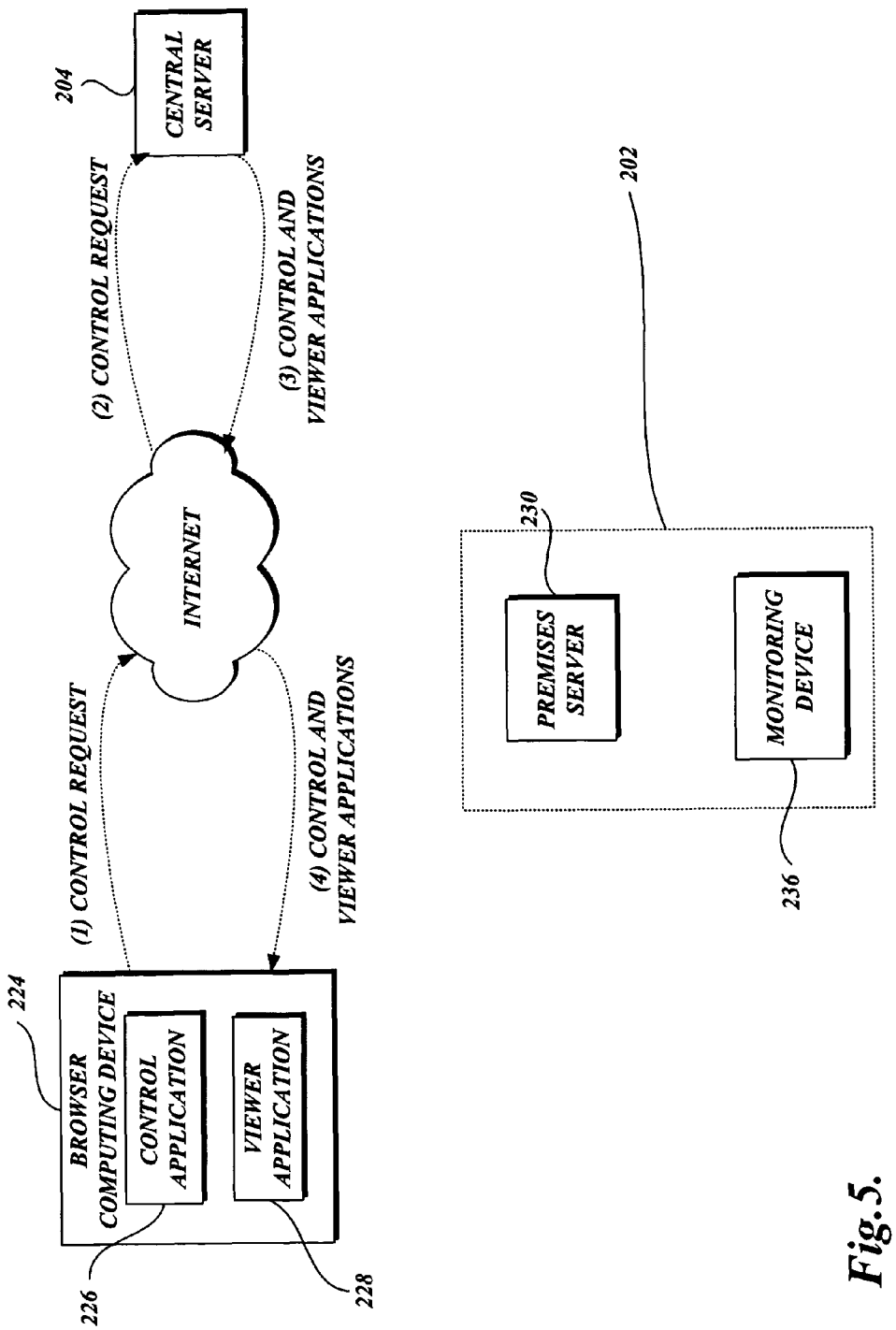
FIG. 5 is a block diagram of an integrated information system depicting the generation of a graphical user interface in accordance with the present invention.
Figure 6:
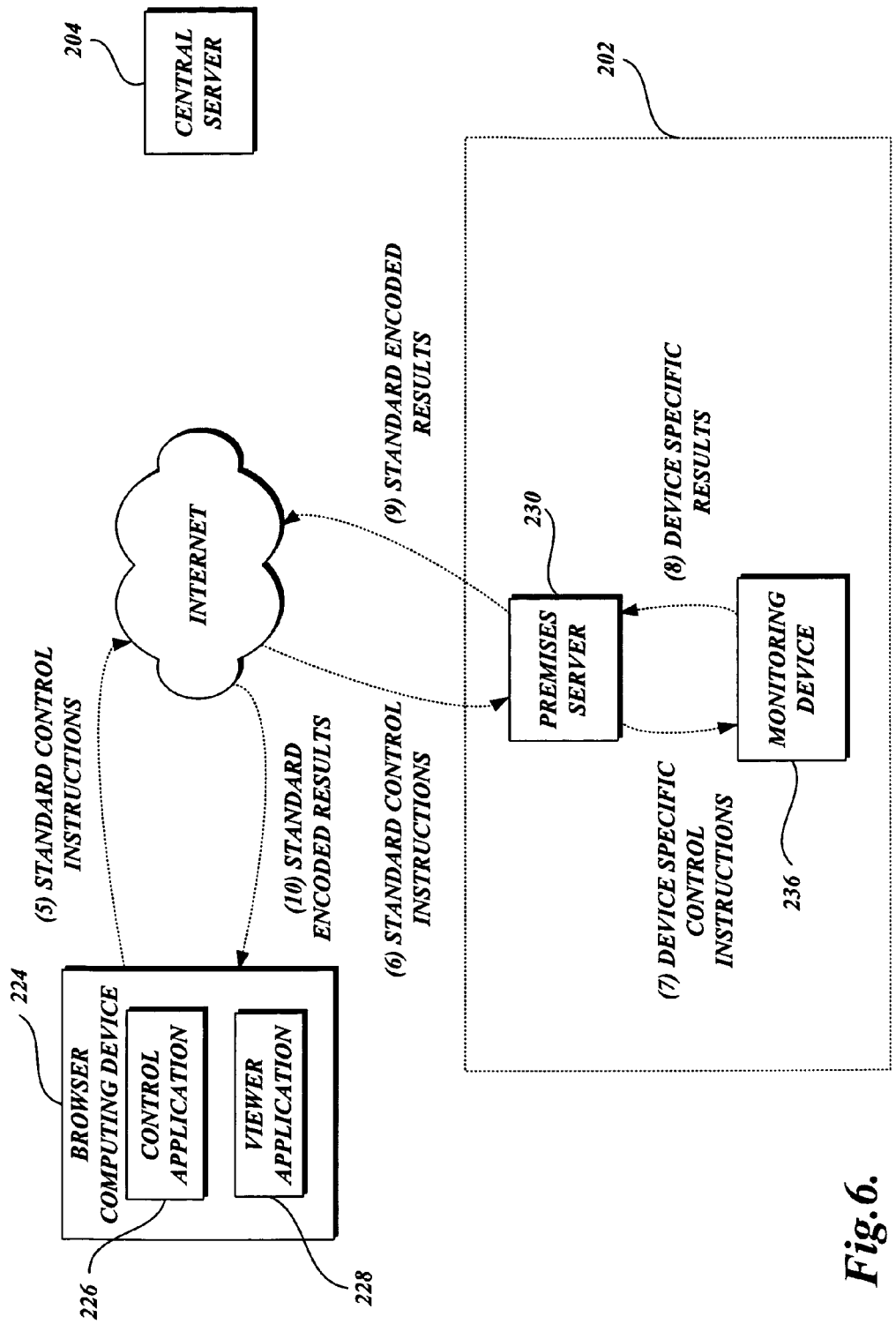
FIG. 6 is a block diagram of an integrated information system depicting the transmission of standard protocol control instructions to a premises server and the translation of the instructions into device-specific protocols in accordance with the present invention.

With reference now to FIGS. 5 and 6, an embodiment for accessing one or more monitoring devices 236 via a browser computing device 224 utilizing a common user interface utilizing standard protocol enabled communications will be described. Generally described, the present invention utilizes an application program interface ("API") for the communication and control of networked devices, such as monitoring devices 236 and monitoring devices 234, in the integrated information system 200. To initiate control, a user submits a control request for manipulating devices to a central server 204 through Internet. In an illustrative embodiment of the present invention, the control request may be initiated as a direct communication to the central server 204 or as a request submitted through an interface, such as a Web page. The user request can include an identification of one or more networked devices desired to be controlled/monitored. Alternatively, the request may include one or more search terms for identifying any networked devices that match inputted criteria. The user request can also include login information and security information that allows the central server 204 to verify the identification of the user and to evaluate security issues relating to accessing one or more of the devices.

Upon obtaining the control request, the central server 204 responds by dynamically generating and sending a control and/or viewer application to the browser computing device 224. In an illustrative embodiment of the present invention, the control and viewer application are sent as Java applets, that when executed by a browser software application creates the control application 226, and viewer application 228. At this time, the premises server 230 and the monitoring devices 236 in a premises 202 are not involved. During this process, the central server 204 may authenticate the user, verify the privilege level of the user, and determine the currently available devices 236, 234 for manipulation and the premises servers 230 controlling those devices. Accordingly, the central server 204 can dynamically cover the browser application to include the necessary graphic and protocol interfaces for each requested networked device to be controlled in the same instance of the browser application.

With reference to FIG. 6, once the control application 226 and the viewer application 228 are executed on the browser computing device 224, the user can choose a device from a list of available devices to be manipulated and choose control instructions to manipulate the selected device. In an illustrative embodiment of the present invention, the user communicates various selections, such as a particular device for manipulation or device control requests, by using the input devices (e.g., a mouse) to select portions of a graphical template relating to their desired action. For instance, to control the pan, tilt, zoom ("PTZ") of an image capture device, a user can manipulate a graphical image of a compass rose. In turn, the control application 226 accepts the user's request and translates the request into a standard protocol command for the request.

Figure 7:
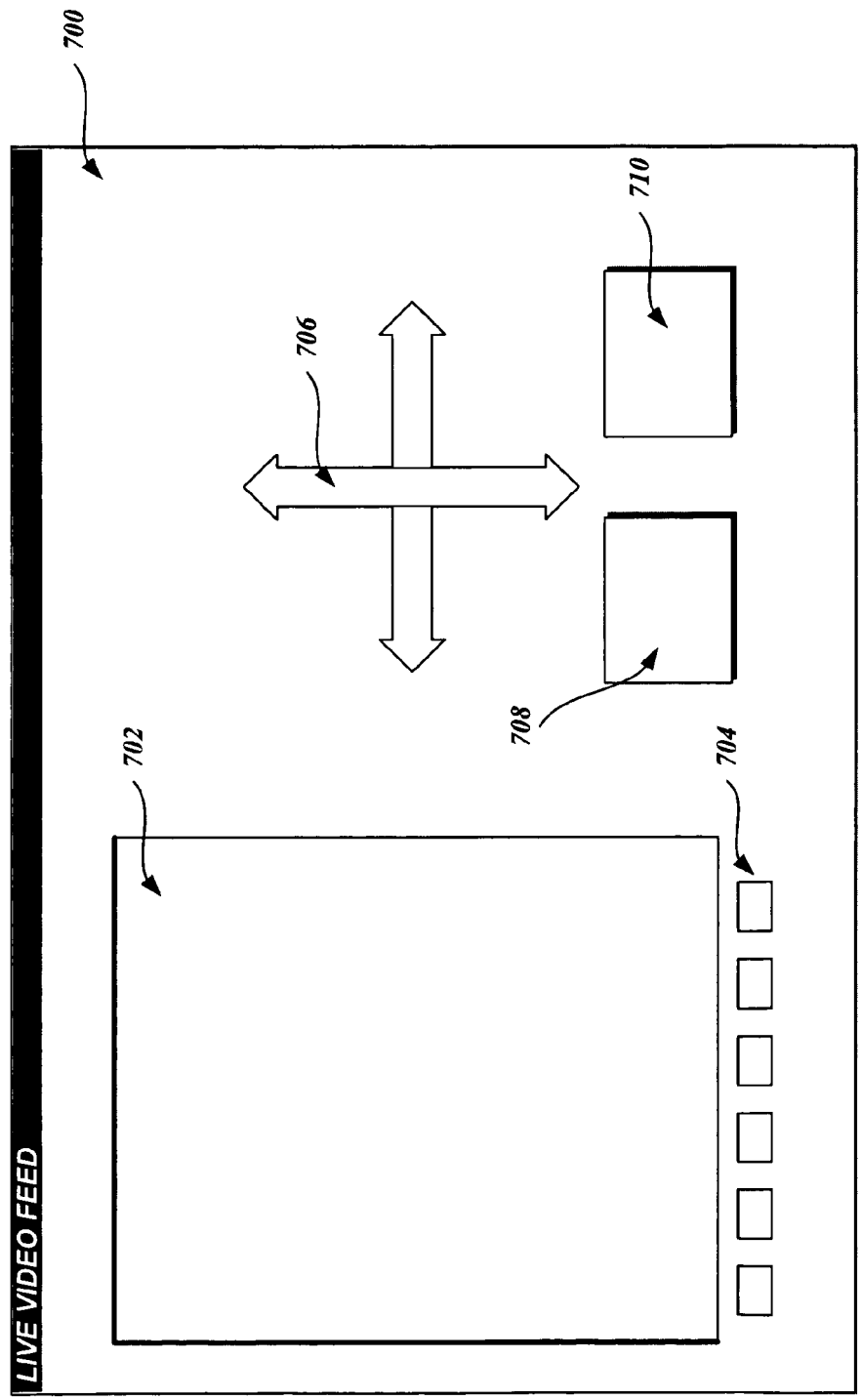
FIG. 7 is a block diagram illustrative of a screen display of a graphical user interface for controlling networked devices in an integrated information portal in accordance with the present invention.

FIG. 7 is a block diagram illustrative of a screen display 700 generated by the browser computing device 224 and including a control application 226 and the viewer application 228. The screen display 700 includes a graphical area 702 operable to display the digital or analog images outputted by a selected monitoring device—an image capture device. Below the graphic image area 702 is a row of control buttons 704 operable to control the display of the output. For example, a user may manipulate one of the control buttons 704 to control the playback of a motion video or to scan through motion video. The screen display 700 can also include additional elements corresponding to a control application 226. For example, the screen display 700 can include a compass rose 706 to control the movement of a device, such as an image capture device. The screen display can also include additional graphical and textual display areas 708, 710 for displaying data for additional devices within the integrated information network. For example, areas 708 and 710 may represent additional digital capture devices in communication with the browser computing device that the user may toggle.

In accordance with an illustrative embodiment of the present invention, the standard protocol utilized by the control application 226 is a generic language capable of controlling basic device activity that is generally common to a particular type of device. For instance, most cameras are capable of pan, tilt, or zoom activity, allowing the device to pan left or right, tilt up or down, or zoom near or far. The standard protocol encodes the user's instructions in an established standard language rather than a manufacturer-specific protocol. Accordingly, the control application 226 is not required to maintain, or otherwise, any manufacturer-specific protocols. For example, with regard to controlling an image capture device, a user indication of panning the device to the left 50% of the maximum range of movement, can generate an instruction in standard protocol, for example as "PAN L/50." Likewise, in the case of controlling a thermostat, a user may want to set a new temperature, at 72 degrees, then the user may type in 72 at the temperature setting field and the control application 223 will generate an instruction in standard protocol language, such as "SET TEMP/72".

Upon receiving the standard protocol encoded instructions, the premises server 230 identifies the targeted device and translates the instructions into device specific protocol instructions. In an illustrative embodiment of the present invention, the device interface database 232 maintains information correlating the standard control instructions and a corresponding device-specific protocol. The premises server 230 then transmits the device specific control instruction to the targeted device, or devices. The device 234, 236 executes the device specific instruction and returns a result of the execution back to the premises server 230. In an illustrative embodiment of the present invention, the result from the premises server 230 can also be translated into a standard protocol by the premises server 230, in the event the output is proprietary to the device. Alternatively, a device may also send the executing result back to the viewer application 228 directly if the device can generate the executing results in the standard protocol. For example, an image capture monitoring device 234 may generate images in a generally acceptable standard format, such as a bitmap or jpeg file.

Figure 8:
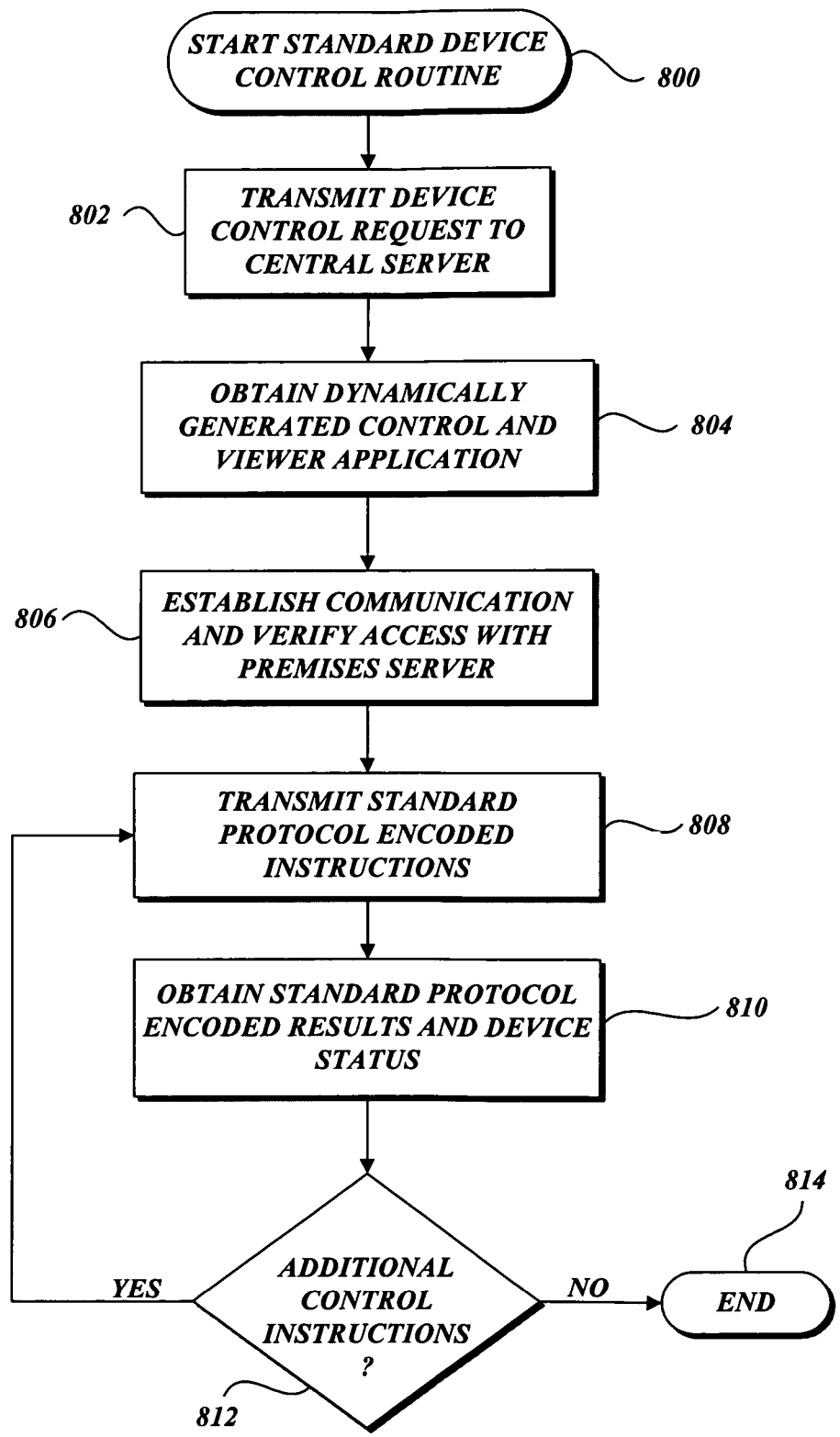
FIG. 8 is a flow diagram illustrative of a device control routine implemented by a computing device having a browser application in an integrated information system in accordance with the present invention.

With reference now to FIG. 8, a standard device control routine 800 implemented by a browser computing device 224 in accordance with the present invention will be described. At block 802, the browser computing device 224 transmits a control request to the central server 204. As explained above, in an illustrative embodiment of the present invention, the browser computing device 224 may transmit a request in the form of communication including an identification of one or more networked devices to control, user identification and authentication information, and the like. Alternatively, the request can include one or more search criteria that will allow the central server 204 to select any networked device matching the criteria. In an alternative embodiment, the control request may be transmitted by displaying a Web page on the browser computing device that allows a user to manipulate one or more fields/component to select desired networked devices.

At block 804, the browser computing device 224 obtains a control application 226 and a viewer application 228 from the central server 204. In accordance with an illustrative embodiment of the present invention, the control and viewer applications 226, 228 are dynamically generated and include Java commands, which, when executed by a Web browser, generate a graphical user interface. The utilization of Java commands, or applets, is well known in the relevant art and will not be explained in greater detail. Both the control and viewer application 226, 228 may include one or more components that are unique to a particular type of networked device. For example, a thermostat control application 226 may include a sliding scale graphical component that can be manipulated to set a desired temperature. Likewise, an image capture control application 226 may include graphical components, such as a compass rose, to allow a user to control the pan, tilt, and zone of a device.

In an illustrative embodiment of the present invention, the Java commands may be operable to generate both the control application 226 and the viewer application 228 as part of a common user interface. An example of a combination control and viewer application is illustrated in screen display 700 (FIG. 7). Additionally, in accordance with the present invention, the Java commands may be operable to generate control and viewer applications for multiple devices in the same browser application. Accordingly, a user may toggle, or otherwise select, which control or viewer components they wish to manipulate. Still further, in an illustrative embodiment of the present invention, a single control application 226 or viewer application 228 may be utilized to correspond to multiple devices. For example, a user may be able to control the recording function of any number of image capture devices by manipulating a single control button, such as control button 704. An example of a dynamically generated user interface is illustrated in co-pending U.S. application Ser. No. 09/966,814, entitled SYSTEM AND METHOD FOR DYNAMIC INTERACTION WITH REMOTE DEVICES, which is hereby incorporated by reference.

At block 806, the browser computing device 224 establishes communication with a premises server 230, or premises servers 230, corresponding to the selected networked device(s) and verifies access to the premises server. In an illustrative embodiment of the present invention, the control and/or viewer application may include identification information, such as an Internet Protocol address, that allows the browser computing device 224 to communicate directly with the premises server 230 via the communication network. Alternatively, the browser computing device 224 may route all communications through the central server 204. In an illustrative embodiment of the present invention, the premises server 230 can transmit one or more reply communications that verify the access and/or transmit the current state of the selected device. For example, if the networked device is a loudspeaker, the premises server 230 may transmit a confirmation communication including the current decibel level of the loudspeaker.

At block 808, the control application 226 or viewer application 228 can begin to transmit control instructions. In accordance with the present invention, the control instructions can include instructions to manipulate one or more settings of the device, data to be outputted by a device, requests for data generated by the device, and the like. Additionally, in accordance with the present invention, the control instructions generated by the browser computing device 224 are encoded in a standard communication protocol. In an illustrative embodiment of the present invention, the standard communication protocol defines functions that are common to a particular type of device, regardless of the manufacturer. The standard communication protocol may include industry designated communication protocols, proprietary communication protocols, or other communication protocols adopted by the integrated information system 200 as a communication standard. In an illustrative embodiment of the present invention, the standard protocol encoded instructions may be transmitted as a single transmission or set of transmissions.

At block 810, the browser computing device 224 obtains standard protocol encoded results and/or networked device status. As described above, one or more outputs from a networked device, such as a monitoring device 236, may be originally generated in a proprietary protocol or a standard communication protocol. As will be described below, in an illustrative embodiment of the present invention, the results from the networked device will be encoded in a standard communication protocol. One skilled in the relevant art will appreciate that outputs can include image data, audio data, device parameter status and the like. Additionally, one skilled in the art will appreciate that the standard communication protocol for encoding instructions may be the same as the standard communication protocol for encoding results. Alternatively, the standard communication protocols may be different.

At decision block 812, a test is conducted to determine whether there are any additional control instructions to be transmitted. For example, a user may designate a single instruction to be sent. Alternatively, the user may designate a series of instructions that are to be sent to one or more networked devices. If there are additional control instructions, the routine 800 returns to block 808. Alternatively, if there are no further instructions to be transmitted, the routine 800 terminates at block 814.

Figure 9:
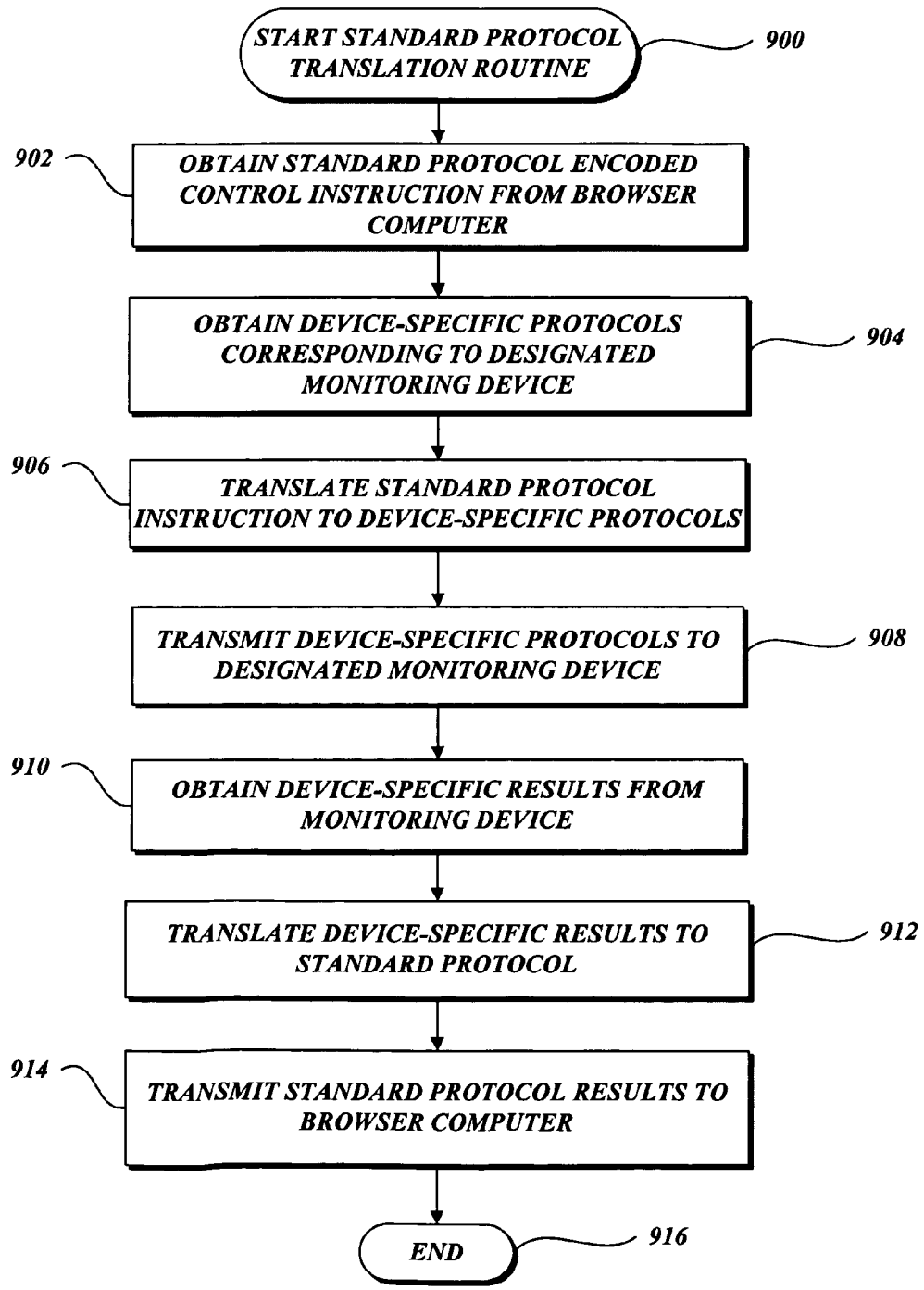
FIG. 9 is a flow diagram illustrative of a standard protocol communication translation routine implemented by a premises server in an integrated information system in accordance with the present invention.

With reference now to FIG. 9, a routine 900 implemented by a premises server 230 for translating standard protocol control instructions will be described. At block 902, the interface application 414 of the premises server 230 receives a standard protocol encoded instruction. In an illustrative embodiment of the present invention, the standard control instruction can include data identifying the one or more networked devices that are to be manipulated by the control instructions. Each instruction can correspond to a single networked device (e.g., a particular image capture device) or to a group of networked devices (e.g., all the image capture devices in communication with the premises server 230). At block 904, the interface application 414 obtains device-specific protocols for the one or more devices designated in the control instruction. In an illustrative embodiment of the present invention, the premises server 230 obtains the device-specific protocols from the device interface database 232.

At block 906 the premises server 230 translates the control instruction into a device-specific protocol corresponding to a designated networked device, such as a monitoring device 236 or output device 234. In an illustrative embodiment of the present invention, the translation can include the correlation of the standard encoded instruction into a corresponding instruction in a device-specific protocol. Additionally, in the event the device-specific protocol supports additional features and/or attributes not specified in the standard encoded instruction, the translation can also include setting one or more default settings. At block 908, the interface application 414 transmits to the designated networked devices. In an illustrative embodiment of the present invention, the interface application 414 may transmit each instruction individually, or as a mass transmission.

As described above, in one embodiment of the present invention, outputs from a networked device, such as a monitoring device 236, may be encoded in a device-specific protocol. Accordingly, in an illustrative embodiment of the present invention, the interface application 414 obtains device-specific protocol encoded output results at block 910. At block 912, the data transmittal application 416 translates the output results from a device-specific protocol into the standard protocol. As described above, the standard protocol may be the same standard protocol utilized to encode the instruction from the browser computing device 224, or may be a separate protocol. At block 914, the data transmittal application 416 transmits the standard protocol results to the browser computing device 224. Additionally, the output results may also be transmitted to the central server 204 for further processing. At block 916, the routine 900 terminates.

One skilled in the relevant art will appreciate that blocks 910-914 may be omitted if the translation is not required. Additionally, as illustrated in FIG. 2B, processing of the output of the results may be conducted by additional computing devices configured for a particular device, such as grabber 238.

Although illustrative embodiments of the present invention have been described with regard to an integrated information system 200 configured for security monitoring, the present invention is not limited to such an implementation. Any networked device capable of control can be managed through a browser computing device 224 in accordance with the present invention without requiring the browser computing device 224 to maintain communication protocols for every networked device. For example, the present invention may be implemented in a wide variety of implementations including controlling moving equipment such as vehicles, submersibles, etc. Moreover, one skilled in the relevant art will further appreciate that the present invention may be implemented in a different network configuration, such as a dedicated device control network, in which a dedicated device server is utilized.

The present invention facilitates use of multiple, dissimilar devices by providing standard interface templates. Additionally, by establishing a dedicated communication channel with the premises server, thereby bypassing a Web or application server, the present invention mitigates unnecessary processing steps that impede the flow of communication. In accordance with the present invention, the configuration of a dedicated communication channel allows for increased scalability of the number of monitoring devices utilized in the integrated information system and controlled by the common user interface.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for controlling devices in a computer system, the method comprising:
   obtaining a user selection of one or more of a plurality of networked devices to be manipulated from a user interface, wherein at least one of the plurality of networked devices requires device-specific protocol instructions that are different from protocol instructions required by at least one of the other plurality of networked devices;
   obtaining a user interface application corresponding to the selected one or more networked devices;
   transmitting, to at least one user interface selection device, the user interface application corresponding to the selected one or more networked devices so that the user interface can be displayed on the at least one user interface selection device;
   obtaining a user selection of an operation corresponding to at least one selected networked device;
   encoding the selected operation according to a standard communication protocol instruction;
   transmitting the selected standard protocol instruction to a server corresponding to the selected networked device; and
   obtaining an output corresponding to the selected operation of the selected networked device.

2. The method as recited in claim 1 further comprising authenticating user privilege levels prior to displaying the user interface.

3. The method as recited in claim 1, wherein the selected networked device is a monitoring device.

4. The method as recited in claim 3, wherein the monitoring device is an image capture monitoring device.

5. The method as recited in claim 4, wherein the user interface includes a display area operable to display outputs corresponding to the image capture monitoring device.

6. The method as recited in claim 3, wherein the monitoring device is a network security monitoring device.

7. The method as recited in claim 1, wherein the selected networked device is an output device.

8. The method as recited in claim 1, wherein the output includes a confirmation corresponding to the selected operation of the selected device.

9. The method as recited in claim 1, wherein the output includes data indicative of a networked device status.

10. The method as recited in claim 1, wherein the user interface application includes one or more Java applets that are operable to generate a graphical user interface.

11. The method as recited in claim 1, further comprising deleting the user interface from the display after obtaining the output corresponding to the device status.

12. The method as recited in claim 1, wherein the standard communication protocol is device independent.

13. The method as recited in claim 1, wherein the user interface is a Web-based graphical user interface.

14. The method as recited in claim 13, wherein the user interface is dynamically generated.

15. The method as recited in claim 1, wherein obtaining a user selection of an operation corresponding to at least one selected networked device includes obtaining a user manipulation of a graphical icon.

16. The method as recited in claim 1, wherein the computer system is a security monitoring network and wherein the networked devices correspond to the security monitoring computer system.

17. A computer-readable medium having a computer-executable program therein for performing the method of controlling devices in a computer system, the method comprising:
   obtaining a user selection of one or more of a plurality of networked devices to be manipulated from a user interface, wherein at least one of the plurality of networked devices requires device-specific protocol instructions that are different than protocol instructions required by at least one of the other plurality of networked devices;
   obtaining a user interface application corresponding to the selected one or more networked devices;
   transmitting, to at least one user interface selection device, the user interface application corresponding to the selected one or more networked devices so that the user interface can be displayed on the at least one user interface selection device;
   obtaining a user selection of an operation corresponding to at least one selected networked device;
   encoding the selected operation according to a standard communication protocol instruction;
   transmitting the selected standard protocol instruction to a server corresponding to the selected networked device; and
   obtaining an output corresponding to the selected operation of the selected networked device.

18. The method as recited in claim 17, further comprising authenticating user privilege levels prior to displaying the user interface.

19. The method as recited in claim 18, wherein the monitoring device is a network security monitoring device.

20. The method as recited in claim 18, wherein the monitoring device is an image capture monitoring device.

21. The method as recited in claim 17, wherein the selected networked device is a monitoring device.

22. The method as recited in claim 21, wherein the user interface includes a display area operable to display outputs corresponding to the image capture monitoring device.

23. The method as recited in claim 17, wherein the selected networked device is an output device.

24. The method as recited in claim 23, wherein the user interface includes a display area operable to display outputs corresponding to the image capture monitoring device.

25. The method as recited in claim 17, wherein the output includes a confirmation corresponding to the selected operation of the selected device.

26. The method as recited in claim 17, wherein the output includes data indicative of a networked device status.

27. The method as recited in claim 17, wherein the user interface application includes one or more Java applets that are operable to generate a graphical user interface.

28. The method as recited in claim 17, further comprising deleting the user interface from the computer system after obtaining the output corresponding to the device status.

29. The method as recited in claim 28, wherein the user interface is dynamically generated.

30. The method as recited in claim 17, wherein the standard communication protocol is device independent.

31. The method as recited in claim 17, wherein the user interface is a Web-based graphical user interface.

32. The method as recited in claim 17, wherein obtaining a user selection of an operation corresponding to at least one selected networked device includes obtaining a user manipulation of a graphical icon.

33. The method as recited in claim 17, wherein the computer system is a security monitoring network and wherein the networked devices correspond to the security monitoring computer system.

34. The method as recited in claim 33, wherein the monitoring device is an image capture monitoring device.

35. A method of controlling devices in a computer system, the method comprising:
obtaining a user selection of one or more of a plurality of networked devices to be manipulated from a user interface, wherein at least one of the plurality of networked devices requires device-specific protocol instructions that are different than protocol instructions required by at least one of the other plurality of networked devices;
obtaining a user interface application corresponding to the selected one or more networked devices;
transmitting, to at least one user interface selection device, the user interface application corresponding to the selected one or more networked devices so that the user interface can be displayed on the at least one user interface selection device;
obtaining a user selection of an operation corresponding to at least one selected networked device;
encoding the selected operation according to a standard communication protocol instruction;
transmitting the selected standard protocol instruction to a server corresponding to the selected networked device; and
obtaining an output corresponding to the selected operation of the selected networked device.

36. The method as recited in claim 35, further comprising authenticating user privilege levels prior to displaying the user interface.

37. The method as recited in claim 35, wherein the selected networked device is a monitoring device.

38. The method as recited in claim 35, wherein the selected networked device is an output device.

39. The method as recited in claim 35, wherein the output includes a confirmation corresponding to the selected operation of the selected device.

40. The method as recited in claim 35, wherein the output includes data indicative of a networked device status.

41. The method as recited in claim 35, wherein the user interface application includes one or more Java applets that are operable to generate a graphical user interface.

42. The method as recited in claim 35, further comprising deleting the user interface from the computer system after obtaining the output corresponding to the device status.

43. The method as recited in claim 42, wherein the user interface is dynamically generated.

44. The method as recited in claim 35, wherein the standard communication protocol is device independent.

45. The method as recited in claim 35, wherein the user interface is a Web-based graphical user interface.

46. The method as recited in claim 35, wherein obtaining a user selection of an operation corresponding to at least one selected networked device includes obtaining a user manipulation of a graphical icon.

47. The method as recited in claim 35, wherein the computer system is a security monitoring network and wherein the networked devices correspond to the security monitoring computer system.

48. A non-transitory computer readable medium providing instructions for controlling a device in a computer system, the instructions comprising:
obtaining a user selection of one or more of a plurality of networked devices to be manipulated from a user interface, wherein at least one of the plurality of networked devices requires device-specific protocol instructions that are different from protocol instructions required by at least one of the other plurality of networked devices;
obtaining a user interface application corresponding to the selected one or more networked devices;
transmitting, to at least one user interface selection device, the user interface application corresponding to the selected one or more networked devices so that the user interface can be displayed on the at least one user interface selection device;
obtaining a user selection of an operation corresponding to at least one selected networked device;
encoding the selected operation according to a standard communication protocol instruction;
transmitting the selected standard protocol instruction to a server corresponding to the selected networked device; and
obtaining an output corresponding to the selected operation of the selected networked device.

49. A method for controlling devices in a computer system, the method comprising:
obtaining a user selection of one or more of a plurality of networked devices to be manipulated from a user interface, wherein at least one of the plurality of networked devices requires device-specific protocol instructions that are different from protocol instructions required by at least one of the other plurality of networked devices;
generating a user interface application corresponding to the selected one or more networked devices;
transmitting, to at least one user interface selection device, the user interface application corresponding to the selected one or more networked devices so that the user interface can be displayed on the at least one user interface selection device;

obtaining a user selection of an operation corresponding to at least one selected networked device;

encoding the selected operation according to a standard communication protocol instruction;

transmitting the selected standard protocol instruction to a server corresponding to the selected networked device; and obtaining an output corresponding to the selected operation of the selected networked device.

50. A non-transitory computer readable medium providing instructions for controlling a device in a computer system, the instructions comprising:

obtaining a user selection of one or more of a plurality of networked devices to be manipulated from a user interface, wherein at least one of the plurality of networked devices requires device-specific protocol instructions that are different from protocol instructions required by at least one of the other plurality of networked devices;

generating a user interface application corresponding to the selected one or more networked devices;

transmitting, to at least one user interface selection device, the user interface application corresponding to the selected one or more networked devices so that the user interface can be displayed on the at least one user interface selection device;

obtaining a user selection of an operation corresponding to at least one selected networked device;

encoding the selected operation according to a standard communication protocol instruction;

transmitting the selected standard protocol instruction to a server corresponding to the selected networked device; and obtaining an output corresponding to the selected operation of the selected networked device.

* * * * *